US008213858B2

(12) United States Patent
Wei et al.

(10) Patent No.: US 8,213,858 B2
(45) Date of Patent: Jul. 3, 2012

(54) WIRELESS DISPLAY SYSTEM AND METHOD THEREOF

(75) Inventors: Wei Wei, Beijing (CN); Zihua Guo, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 1059 days.

(21) Appl. No.: 12/096,002

(22) PCT Filed: Dec. 5, 2006

(86) PCT No.: PCT/CN2006/003283
§ 371 (c)(1),
(2), (4) Date: Jun. 3, 2008

(87) PCT Pub. No.: WO2007/065350
PCT Pub. Date: Jun. 14, 2007

(65) Prior Publication Data
US 2009/0029647 A1    Jan. 29, 2009

(51) Int. Cl.
*H04H 20/71* (2008.01)
(52) U.S. Cl. ............ 455/3.05; 455/3.01; 455/3.06; 455/41.2; 455/500; 455/503; 455/556.1; 455/556.2; 455/566; 345/581; 345/1.1; 345/2.1; 345/2.3; 725/81
(58) Field of Classification Search .......... 455/3.01, 455/3.05, 3.06, 41.2, 41.3, 500, 503, 556.1–556.2, 455/566, 557; 345/581, 1.1, 2.1, 2.3; 370/470–476; 725/81, 118, 148, 151, 153
See application file for complete search history.

(56) References Cited

U.S. PATENT DOCUMENTS

| | | |
|---|---|---|
| 6,941,395 B1 | 9/2005 | Galang et al. |
| 7,318,099 B2 * | 1/2008 | Stahl et al. ............ 709/229 |
| 7,327,385 B2 * | 2/2008 | Yamaguchi ............ 348/207.1 |
| 7,484,112 B2 | 1/2009 | Noorbakhsh et al. |
| 7,489,669 B2 * | 2/2009 | Moritomo et al. .......... 370/338 |
| 7,518,624 B2 | 4/2009 | Ford et al. |
| 7,743,395 B2 * | 6/2010 | Hirt et al. ............ 725/35 |
| 2002/0018115 A1 | 2/2002 | Sakata |
| 2003/0098819 A1 | 5/2003 | Sukthankar et al. |
| 2003/0208779 A1 | 11/2003 | Green et al. |
| 2004/0083302 A1 | 4/2004 | Thornton |
| 2004/0117538 A1 | 6/2004 | Liu |
| 2004/0181806 A1 | 9/2004 | Sullivan |
| 2005/0097408 A1 | 5/2005 | Palin |
| 2005/0120381 A1 | 6/2005 | Yamaguchi |
| 2005/0289631 A1 * | 12/2005 | Shoemake ............ 725/118 |
| 2006/0164328 A1 * | 7/2006 | Jaff ............ 345/2.3 |
| 2006/0189271 A1 | 8/2006 | Wu et al. |
| 2007/0011712 A1 | 1/2007 | White et al. |

(Continued)

FOREIGN PATENT DOCUMENTS

CN    1332417 A    1/2002

(Continued)

*Primary Examiner* — Tuan A Tran
(74) *Attorney, Agent, or Firm* — Dickstein Shapiro LLP

(57) ABSTRACT

A wireless display system is disclosed comprising a host-side data communication apparatus connected to a host and configured to acquire media data containing at least display data from the hardware of the host, generate data message and transfer the data message wirelessly, and a display-device side data communication apparatus configured to receive the data message transferred wirelessly, interpret it into media data and then output to a display device. With the system of the present invention, CPU does not need to execute a screen-capturing program to acquire display information from a display memory unit and thus has a reduced work load, and transmission delay can also be reduced.

34 Claims, 13 Drawing Sheets

U.S. PATENT DOCUMENTS

| | | |
|---|---|---|
| 2007/0061414 A1 | 3/2007 | Bakke |
| 2007/0094699 A1 | 4/2007 | Chen |
| 2007/0260785 A1 | 11/2007 | Chen |
| 2008/0052428 A1 | 2/2008 | Liang et al. |
| 2008/0148307 A1 | 6/2008 | Nielsen et al. |
| 2008/0225771 A1 | 9/2008 | Guo et al. |
| 2009/0029647 A1 | 1/2009 | Wei et al. |
| 2009/0109332 A1 | 4/2009 | Lin |
| 2009/0174826 A1 | 7/2009 | Ford et al. |

FOREIGN PATENT DOCUMENTS

| | | | |
|---|---|---|---|
| CN | 1387133 A | | 12/2002 |
| CN | 1394428 A | | 1/2003 |
| CN | 1612519 A | | 5/2005 |
| EP | 1 359 744 | | 11/2003 |
| EP | 1 956 845 A1 | | 8/2008 |
| GB | 2 448 429 A | | 10/2008 |
| JP | 7-160851 A | | 6/1995 |
| JP | 10-021044 A | | 1/1998 |
| JP | 10-207797 A | | 8/1998 |
| JP | 2004-086277 A | | 3/2004 |
| JP | 2004-177784 A | | 6/2004 |
| JP | 2005-056303 A | | 3/2005 |
| JP | 2005-129039 A | | 5/2005 |
| JP | 2005-151378 A | | 6/2005 |
| WO | WO-98/16065 A1 | | 4/1998 |
| WO | WO-2004/083302 A1 | | 9/2004 |
| WO | WO-2005/006090 A1 | | 1/2005 |
| WO | WO-2005/018191 A2 | | 2/2005 |
| WO | WO-2005/050413 | | 6/2005 |
| WO | WO-2005/091161 | | 9/2005 |
| WO | WO-2006/031356 A2 | | 3/2006 |
| WO | WO-2006/052339 A2 | | 5/2006 |

* cited by examiner

WIRELESS DISPLAY SYSTEM AND METHOD THEREOF

BACKGROUND OF THE INVENTION

1. Field of Invention

The present invention relates to wireless display technology, in particular to a wireless display system and method as well as wireless data communication apparatus used in the system.

2. Description of Related Prior Art

The existing wireless display technology is mainly based on screen-capturing technique, which is to read the current content present in a display memory unit in order to capture the content currently displayed on the screen. Then, the captured content is compressed into screen information by CPU with a compression algorithm, and the compressed information is delivered to a display device in a real time manner by use of certain wireless network protocol. At the side of the display device, a dedicated embedded computer module carries out protocol interpretation, restores the compressed screen information and provides the contained pixel information to the display device for display.

Unfortunately, the existing screen-capturing method has the following disadvantages.

1. It occupies a significant part of computational resource of a host. The major reason is that, in the screen-capturing mode, CPU has to conduct two tasks at the same time, one is to perform a realtime decode so as to play the content of audio and video, and the other one is to execute the screen-capturing program, acquire display data from a graphics adaptor, compress the data and transfer to a wireless display device through a wireless network card. These two tasks occupy the resource of CPU to an excessive extent and thus affect the processing speed of CPU, which disables the realtime display of high-quality images.

2. It requires a high cost. With the screen-capturing mechanism, the host requires CPU of strong computational capability to conduct encoding and decoding, thereby leading to a high cost.

Considering the above problems, it is desirable to provide a new wireless display mechanism.

SUMMARY OF THE INVENTION

The technical problem the present invention aims to solve with respect to the above disadvantages is to provide a wireless display apparatus, which occupies less CPU resource or no CPU resource, has the ability to realize wireless display function much better and costs less than the existing one.

In one aspect of the present invention, a wireless display system is provided comprising a host-side data communication apparatus connected to a host and configured to acquire media data containing at least display data from the hardware of said host, generate data message and transfer the data message wirelessly, and a display-device side data communication apparatus configured to receive the data message transferred wirelessly, interpret it into media data and then output to at least a display device.

Preferably, said host-side data communication apparatus comprises a data collecting section for acquiring said media data from the hardware of said host, and a host-side wireless communication section for transmitting said media data in the form of data message.

Preferably, said host-side wireless communication section comprises a data protocol packetizing unit for packetizing the media data acquired by said data collecting section into corresponding data message in accordance with certain network transport protocol, a UWB transceiving unit for transmitting said data message wirelessly with UWB, and a control unit for controlling said UWB transceiving unit as well as performing authentication and negotiation on keys.

Preferably, said data collecting section comprises an A/D converter.

Preferably, said data protocol packetizing unit comprises an ADC control unit.

Preferably, said control unit comprises a HSDI control unit.

Preferably, said host-side data communication apparatus is inserted externally at the output interface of the graphics adaptor of said host or connected directly to the output interface of a graphics adaptor internally so as to obtain the display data directly from the output of said graphics adaptor.

Preferably, said host-side data communication apparatus further comprises a data compression section for compressing the display data acquired by said data collecting section and then transmitting the compressed display data to said data protocol packetizing unit.

Preferably, the communication protocol between said host-side data communication apparatus and said display device-side data communication apparatus employs TCP/IP, wireless USB, wireless 1394, or any other predefined transport protocol.

Preferably, said data collecting section comprises an image processing unit for receiving display information and converting it into pixel information and display control signals, and an audio processing unit for receiving sound information and converting it into audio signals.

Preferably, said host-side wireless communication section comprises a probing & connecting unit for establishing a wireless connection between said host and said display device, a communication control unit for control communication quality, a codec unit for performing message coding on video pixel information and control signals or audio signals, a UWB transceiving unit for receiving the encoded message and further encoding and modulating it to wireless signals for transmission.

Preferably, said communication control unit receives display device parameters transferred by probe response message, determines transmission parameters and message coding format based on the display device parameters and user-set display parameters, and transmits the transmission parameters and message coding format through said UWB transceiving unit.

Preferably, said communication control unit probes the strength of the signals transferred by said display device and packet loss ratio result, calculates the distance and interference between said host and said display device, and, based on theses factors, adjusts the transmitting power of said UWB transceiving unit.

Preferably, the message encoded by said codec unit contains at least (1) display device identification information, (2) message type information, (3) message length information and (4) video or audio message data.

Preferably, said video message data contains at least (1) field synchro information, (2) line synchro information, (3) pixel cell identification and (4) pixel data.

Preferably, all types of information in said video message is positioned in such order that the filed synchro information is followed by the pixel information contained in all lines within one field, and the line synchro information is followed by all pixel information contained in one line.

Preferably, said display device-side data communication apparatus comprises a display device-side wireless communication section for receiving the data message transferred wirelessly and interpreting it into media data in accordance with corresponding protocol, and a data output section for transferring said media data to at least said display device.

Preferably, said display device-side wireless communication section comprises a UWB transceiving unit for receiving the data message from said host wirelessly with UWB, a control unit for controlling said UWB transceiving unit as well as performing authentication and negotiation on keys, a data protocol unpacketizing unit for interpreting the data message received by said UWB transceiving unit into the media data in accordance with corresponding protocol.

Preferably, said data protocol unpacketizing unit is HSDI control unit.

Preferably, said data output section comprises a VGA DMA unit, a VGA control unit and a VGA Timing unit.

Preferably, said data protocol unpacketizing unit is embedded processing chip.

Preferably, said data output section is GPU.

Preferably, said display device-side data communication apparatus is inserted externally on said display device or integrated into said display device.

Preferably, said display device-side data communication apparatus performs high-speed refresh processing by directly using transmitted frame pixel data.

Preferably, said display device-side data communication apparatus further comprises a data decompression unit for decompressing the display data unpacketized by said data protocol unpacketizing unit and then transferring to said data output section.

Preferably, said display device-side wireless communication section comprises a UWB transceiving unit for receiving and decoding the wireless signals transmitted from said host, a codec unit for receiving the decoded signals and further decoding them as pixel information, control signals or audio signals, a communication control unit for control communication quality, and a probing & connecting unit for establishing a wireless connection between said host and said display device.

Preferably, said communication control unit acquires from the control signals display device parameters used in determining line and field parameters.

Preferably, said data output section comprises a display controller for receiving pixel information and display control signals, driving said display device based on said information, and an audio output unit for receiving the decoded audio signals and generating a drive signal for driving a speaker.

In another aspect of the present invention, a wireless display method is provided comprising a transmitting step of, at the side of a host, acquiring media data containing at least display data from the hardware of said host, generating data message and transfer the data message wirelessly, and a receiving step of, at the side of a display device, receiving the data message transferred wirelessly, interpreting it into media data and then outputting to at least said display device.

Preferably, said transmitting step comprises acquiring said media data from said host and transmitting said media data in the form of data message.

Preferably, said step of transmitting said media data in the form of data message comprises packetizing the acquired media data into corresponding data message in accordance with certain network transport protocol, and transmitting said data message wirelessly with UWB.

Preferably, said receiving step comprises receiving the data message transferred wirelessly, interpreting it into media data in accordance with corresponding protocol and transferring said media data to at least said display device.

Preferably, said step of receiving the data message transferred wirelessly and interpreting it into media data in accordance with corresponding protocol comprises receiving the data message from said host wirelessly with UWB, and interpreting the received data message into the media data in accordance with corresponding protocol.

Preferably, the method further comprises establishing connection between said host and said display device before said transmitting step.

Preferably, said step of establishing connection comprises: transmitting probe message containing display device identification information from said host to said display device; receiving, by said display device, said probe message and comparing the identification information in said probe message with the identification information of said display device; transmitting probe response message from said display device to said host when the identification information in said probe message coincides with the identification information of said display device, said probe response message containing technical parameters and model of said display device; and receiving, by said host, said probe response message and establishing connection.

Preferably, the method further comprises determining, by said host, the coding format of the data message transmitted to said display device based on the technical parameters and model of said display device.

Preferably, said method further comprises calculating, by said host, the distance and interference between said host and said display device based on the strength of the signals transferred by said display device and packet loss ratio result during the connection establishment, and adjusting the transmitting power of wireless signals.

Preferably, said method further comprises detecting, by said display device, the integrity check code of the probe message so as to configure link layer parameters and physical layer parameters.

In still another aspect of the present invention, a host-side data communication apparatus is provided comprising a data collecting section for acquiring media data containing at least display data from the hardware of a host, and a host-side wireless communication section for transmitting said media data in the form of data message.

Preferably, said host-side wireless communication section comprises a data protocol packetizing unit for packetizing the acquired media data into corresponding data message in accordance with certain network transport protocol, a first UWB transceiving unit for transmitting said data message wirelessly with UWB, and a first control unit for controlling said first UWB transceiving unit as well as performing authentication and negotiation on keys.

In yet another aspect of the present invention, a display device-side data communication apparatus is provided comprising a display device-side wireless communication section for receiving the data message transferred wirelessly and interpreting it into media data in accordance with corresponding protocol, and a data output section for transferring said media data to at least a display device.

Preferably, said display device-side wireless communication section comprises a second UWB transceiving unit for receiving the data message from a host wirelessly with UWB, a second control unit for controlling said second UWB transceiving unit as well as performing authentication and negotiation on keys, a data protocol unpacketizing unit for interpreting the data message received by said second UWB transceiving unit into the media data in accordance with corresponding protocol.

In yet another aspect of the present invention, a wireless display system is provided comprising a schedule unit for dividing video or audio information data from a host into blocks and allocating the divided data to each of a plurality of host-side data communication apparatus, the plurality of host-side data communication apparatus for transmitting the divided data in the form of wireless signals, a plurality of display device-side data communication apparatus for receiving the wireless signals from said plurality of host-side data communication apparatus and decoding said wireless signals into corresponding data blocks, and a combining unit for combining the corresponding data blocks to form the video or audio information.

Compared with the existing technology, the present invention has advantages: since the pixel information and display control signals generated by a host-side display adaptor or a display chip are directly used for wireless transmission, CPU in a computer does not need to execute a screen-capturing program to acquire display information from a display memory unit and thus has a reduced work load.

DETAILED DESCRIPTION OF THE PREFERRED EMBODIMENTS

Hereafter, specific embodiments of the present invention will be elaborated with reference to the figures.

Figure 1:
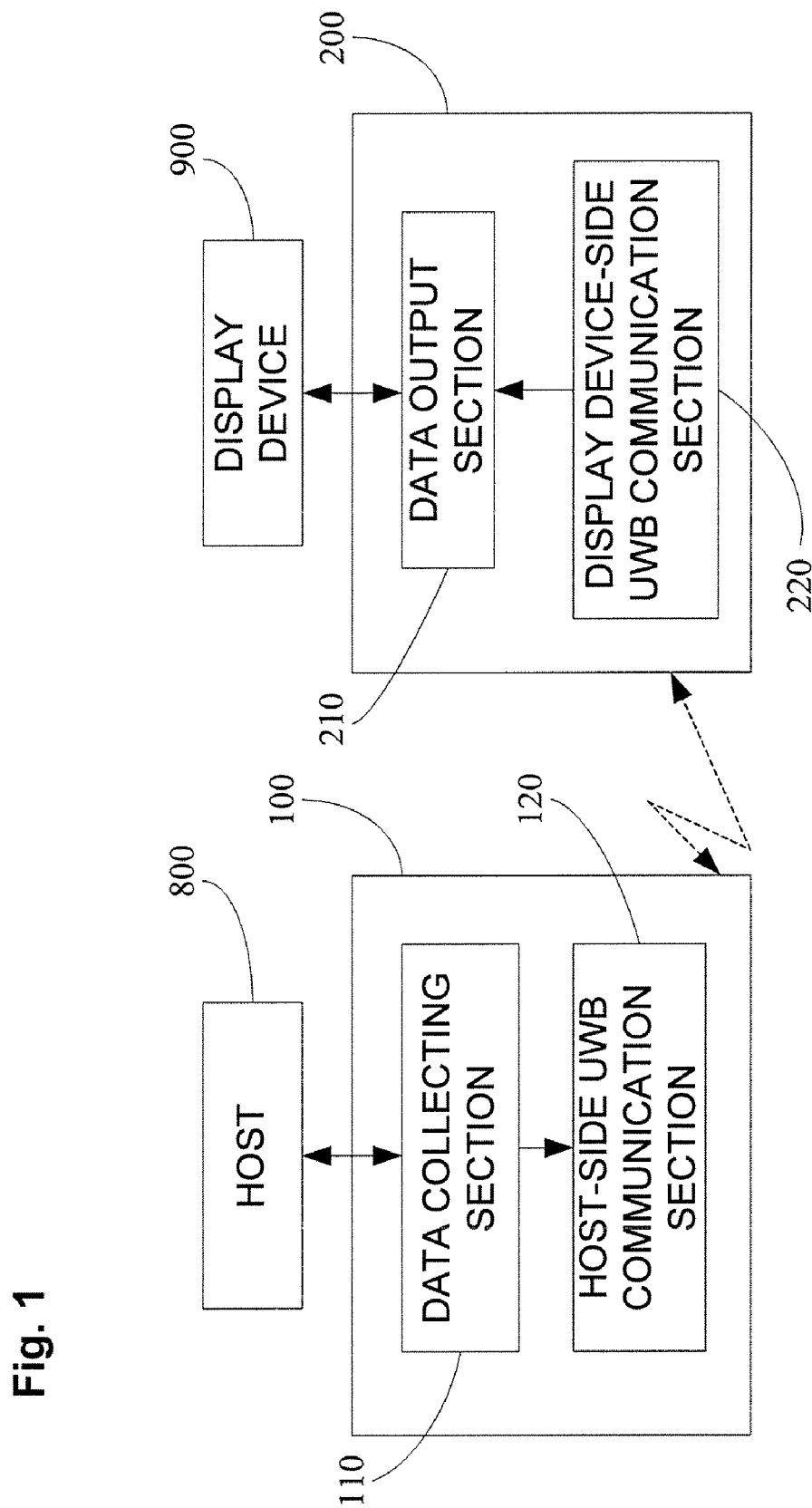
FIG. 1 is a principle diagram for a wireless display system of the present invention.

FIG. 1 shows a principle diagram for a wireless display system of the first embodiment of the present invention. As shown in FIG. 1, the wireless display system according to the present embodiment comprises a host 800, a host-side data communication apparatus 100, a display device-side data communication apparatus 200 and a display device 900. The host-side data communication apparatus 100 includes a data collecting section 110 for collecting display-related information from hardware device of the host by directly acquiring or sampling the information from the host and a host-side UWB communication section 120 for sending out the display-related information in the manner of UWB. The display device-side data communication apparatus 200 includes a display device-side UWB communication section 220 for receiving the display-related information in the manner of UWB and a data output section 210 for outputting the display-related information to the display device 900.

Figure 2:
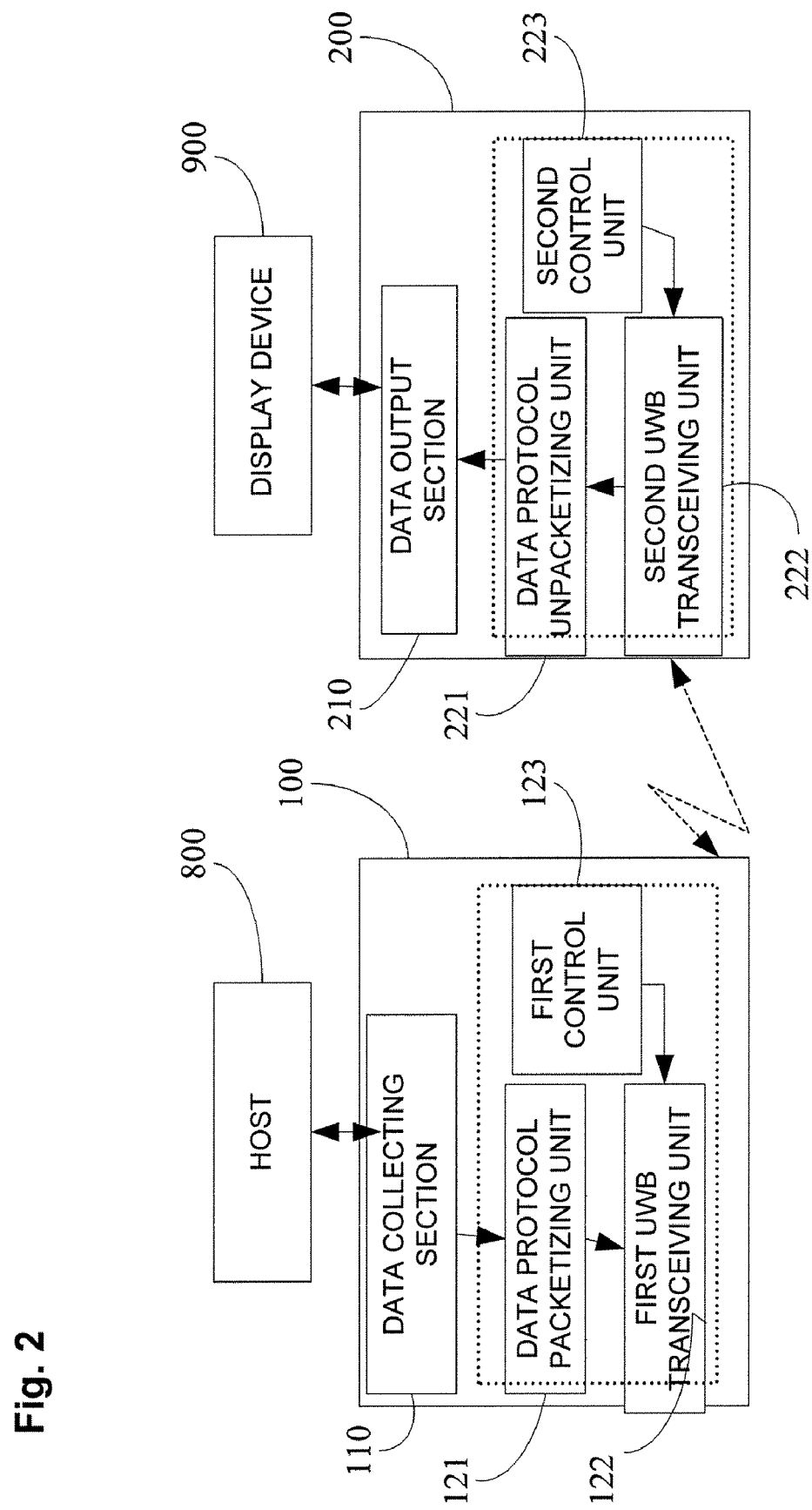
FIG. 2 is a block diagram for the wireless display system of the first embodiment of the present invention.

FIG. 2 is a detailed block diagram for the wireless display system of the first embodiment of the present invention. As shown in FIG. 2, the host-side UWB communication section 120 comprises a data protocol packetizing unit 121, a first UWB transceiving unit 122 and a first control unit 123. The display device-side UWB communication section 220 comprises a second UWB transceiving unit 222, a second control unit 223 and a data protocol unpacketizing unit 221.

The host 800 can be all kinds of computer mainframe, such as the mainframe of PC or a server, a notebook computer, a handheld device like cell phone or PDA, a set-top box (STB), a VCR (video compressed disk) playing device, a DVD (digital video disk) playing device, personal video recorder (PVR), etc. The display device 900 can be a variety of display devices, such as monitor (LCD, CRT, etc.) of a computer, projector, television and the like. Detailed description thereof will not be repeated here.

In the host-side data communication apparatus 100, the data collecting section 110 acquires the display-related data from the hardware of the host 800, for example, a graphics adaptor in the host 800.

The data protocol packetizing unit 121 packetizes the display-related data acquired by the data collecting unit 110 into corresponding data message according to a predetermined communication protocol.

The first UWB transceiving unit 122 transfers the data message to the device-side data communication apparatus 200 in the manner of UWB.

The first control unit 123 controls the first UWB transceiving unit 122 as well as performs authentication, negotiation on keys and the like between the host and the display device.

In the device-side data communication apparatus 200, the second UWB transceiving unit 222 receives the data message from the host-side data communication apparatus 100 in the manner of UWB.

The second control unit 223 controls the second UWB transceiving unit 222 as well as performs authentication, negotiation on keys and the like between the host and the display device.

The data protocol unpacketizing unit 221 decodes the data message received by the second UWB transceiving unit 222 into screen data according to the predetermined communication protocol.

The data output section 210 transfers the above screen data to the display device 900 for outputting.

The communication protocol between the host-side data communication apparatus 100 and the display device-side data communication apparatus 200 can employ TCP/IP, wireless USB, wireless 1394, or DVI/HSDI protocol or any other predefined transport protocol.

According to one embodiment of the present invention, digital pixel signals are transmitted with UWB. In the extreme case, the frame rate of transmission is the frame rate at which the video is played, that is, at least 25 frames per second.

On the other hand, in order to display pixel data at the receiving side in realtime manner, the display device-side data communication apparatus 200 as another embodiment of the present invention has a simple display control mechanism (i.e., the function of a graphics adaptor) and can utilize the transmitted pixel data of 25 frames directly to perform high-speed refresh processing, for example, at 85 frames per second.

Figure 3:
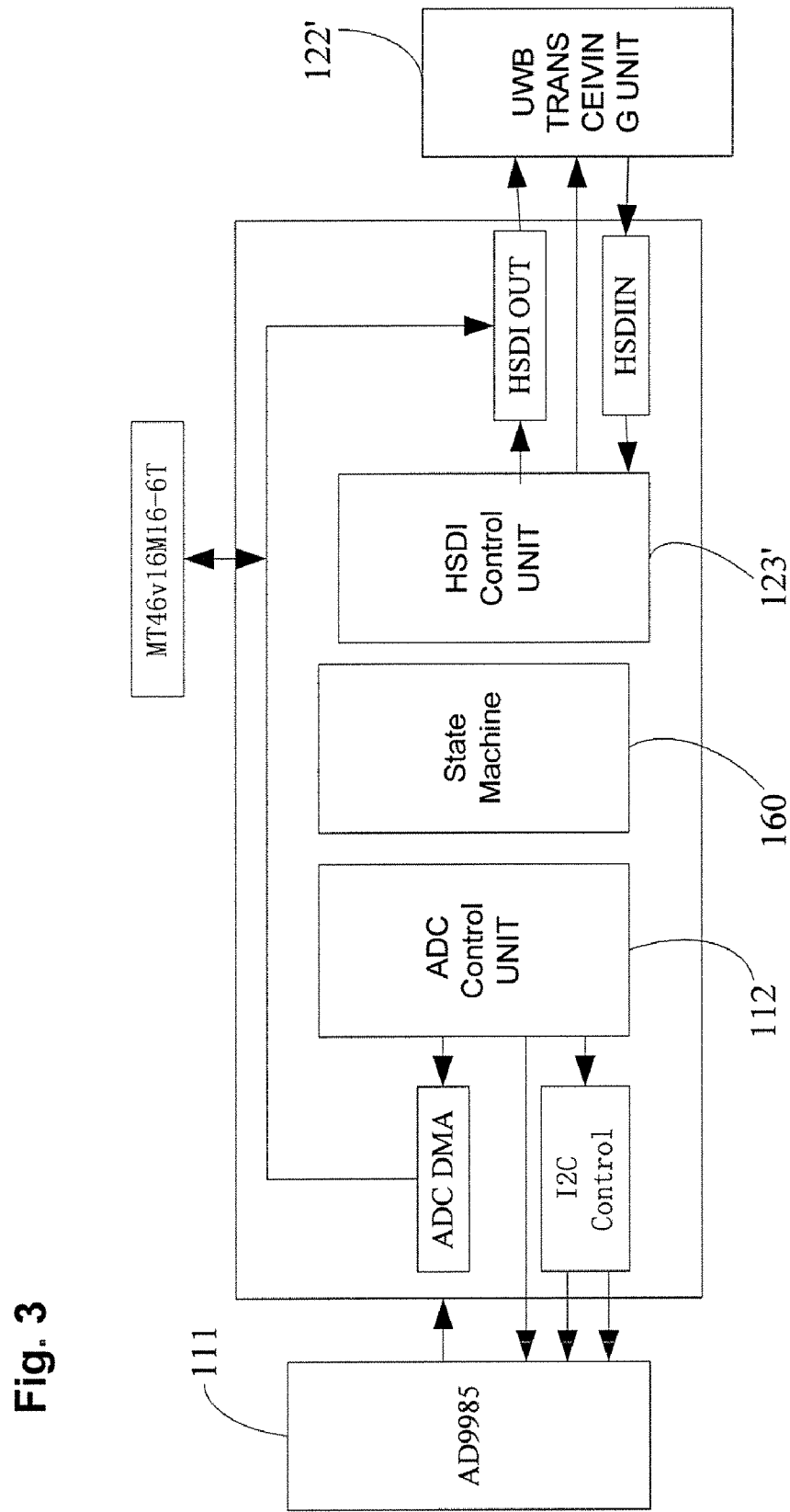
FIG. 3 is a schematic diagram for an example of the host-side data communication apparatus shown in FIG. 2.

FIG. 3 is a schematic diagram for an example of the host-side data communication apparatus shown in FIG. 2.

The host-side data communication apparatus 100 as shown in FIG. 3 is connected externally to the VGA interface of a graphics adaptor in the host and is implemented in FPGA.

The task of collecting display data is fulfilled by an A/D converter, for example, AD9985 unit 111 and ADC control unit 112.

Data compression and data protocol packetizing are completed in the ADC control unit 112. In order to reduce the transmission of data, the collected data can be compressed (obviously, the data compression can be skipped) and then undergo protocol packetizing.

State Machine unit 160 is responsible for overall control and timing coordination.

The UWB transceiver 122' sends out the data message under the control of HSDI Control unit 123'.

According to one embodiment of the present invention, the display device-side data communication apparatus 200 can be realized on the basis of an embedded architecture with CPU being the core, and can also be implemented in a hardware form of FPGA.

Figure 4:
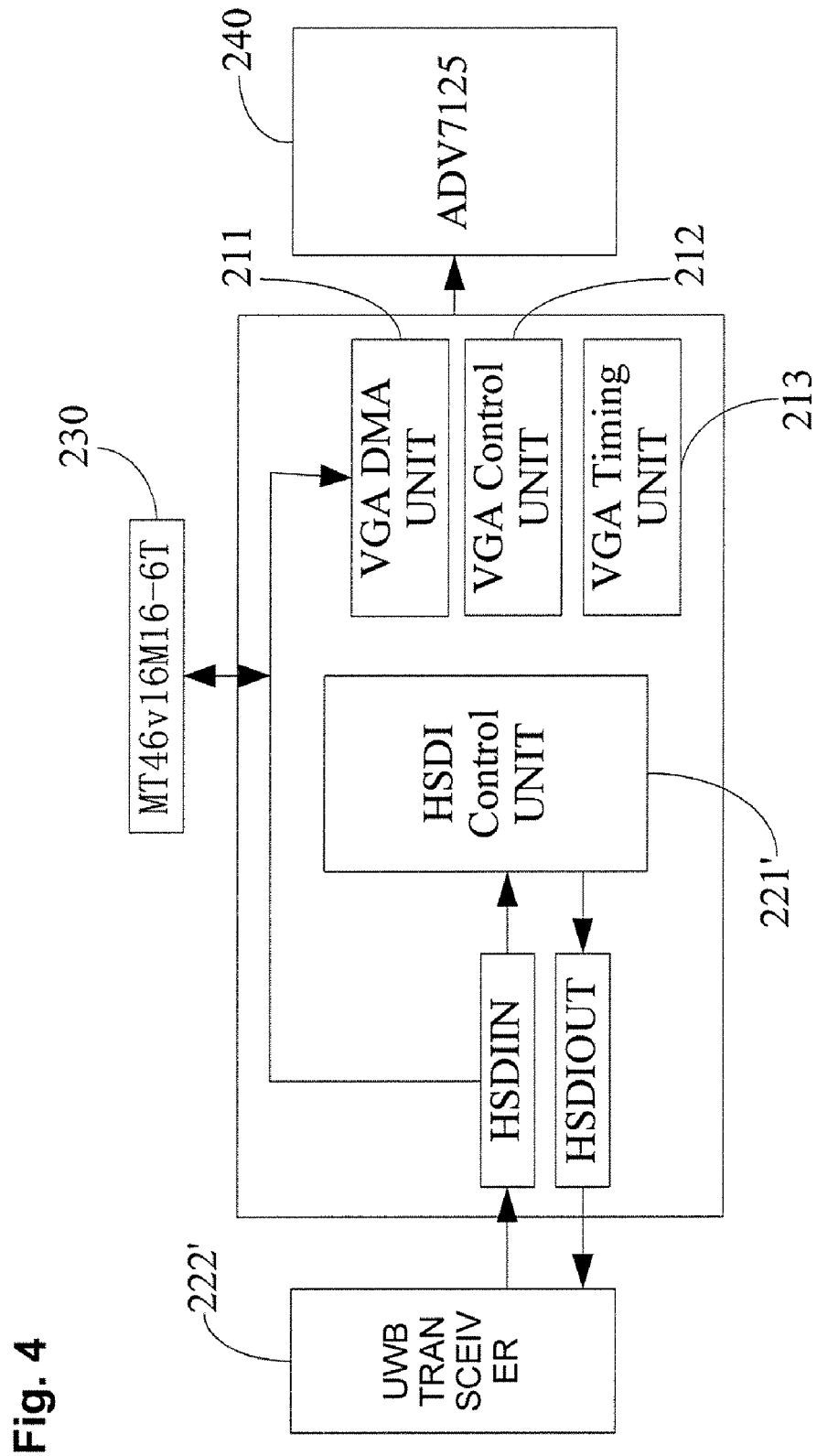
FIG. 4 is a schematic diagram for an example of the display device-side data communication apparatus shown in FIG. 2.

FIG. 4 is a schematic diagram for an example of the display device-side data communication apparatus shown in FIG. 2. In the example shown in FIG. 4, the display device-side data communication apparatus 200 is implemented in a pure hardware form of FPGA.

In this example, the HSDI Control unit 221' is used to process the data from the UWB transceiver 222' as well as perform data protocol unpacketizing and data decompression (if data is compressed). The data enters the HSDI Control unit 221' from the UWB transceiver 222' through a HSDI (High Speed Differential Interface) interface (not shown).

The display and output function of the data output section 210 is achieved by the cooperation of VGA DMA unit 211, VGA Control unit 212 and VGA Timing unit 213.

In other words, the common function of VGA DMA unit 211, VGA Control unit 212 and VGA Timing unit 213 is to extract frame data from a display receiving buffer 230 (e.g., MT46v16M16-6T), form a frame, send it to a DIA converter 240 (e.g. ADV7125) for conversion and then output to the display device 900.

The VGA DMA unit 211 extracts the screen data in DDR from the DDR in the manner of DMA. The VGA Control unit 212 controls read and write timing for various VGA line/frame. The VGA Timing unit 213 generates various timing for VGA line/frame information.

Figure 5:
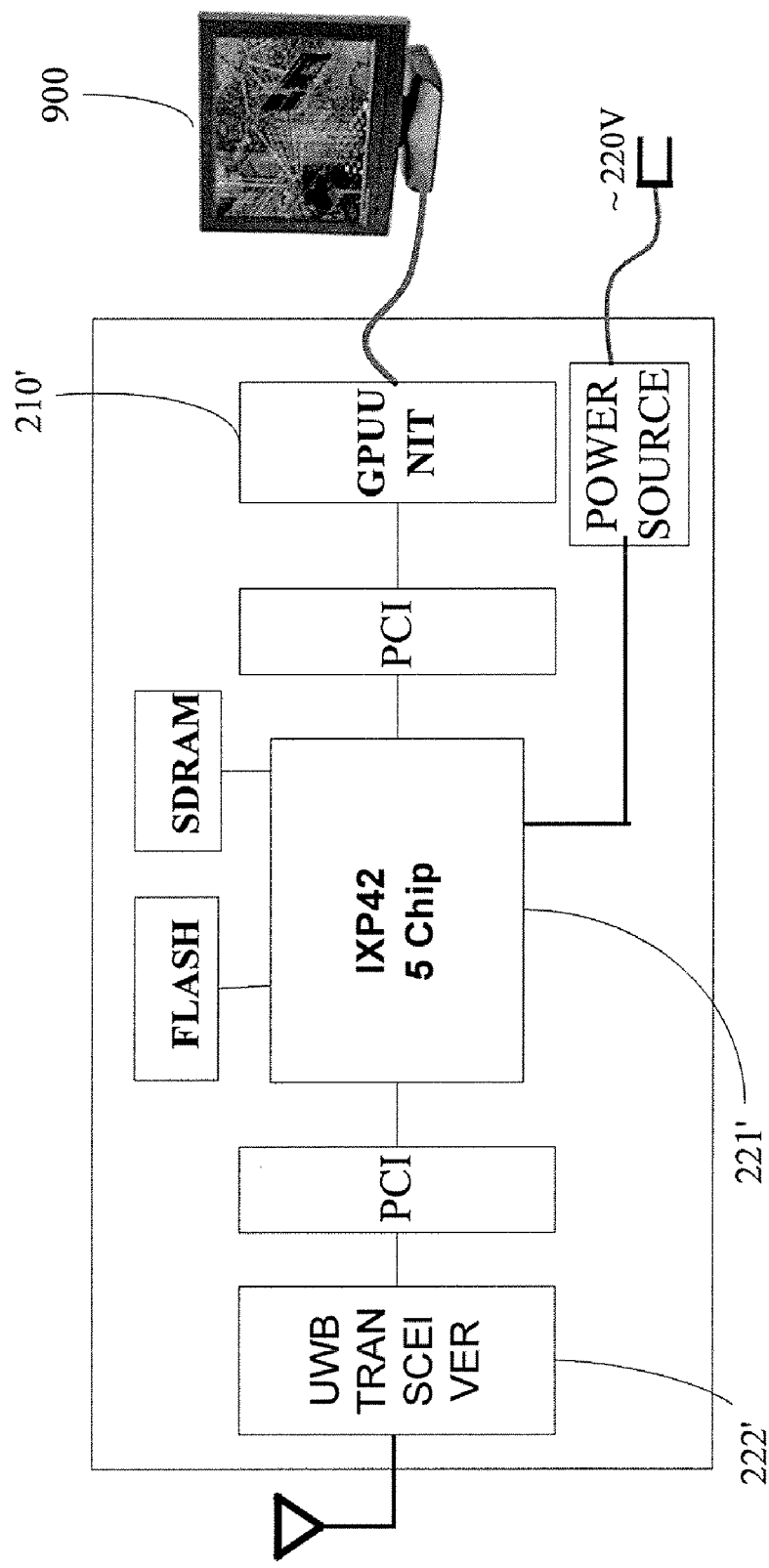
FIG. 5 is a schematic diagram for another example of the display device-side data communication apparatus shown in FIG. 2.

FIG. 5 is a schematic diagram for another example of the display device-side data communication apparatus shown in FIG. 2. The example shown in FIG. 5 realizes the device-side data communication apparatus 200 in an embedded system.

In this example, IXP425 chip 221' processes the data from the UWB transceiver 222' as well as performs the interpretation of data message on network layer/transmission layer and application layer protocols.

GPU unit (Graphic Process Unit) 210' fulfills the function of displaying and outputting the screen data and acts in the same way as VGA DMA unit 211, VGA Control unit 212 and VGA Timing unit 213 in FIG. 4. GPU unit 210' needs to conduct only a simple function of display control, since the rendering work has been completed at the host side.

Figure 6:
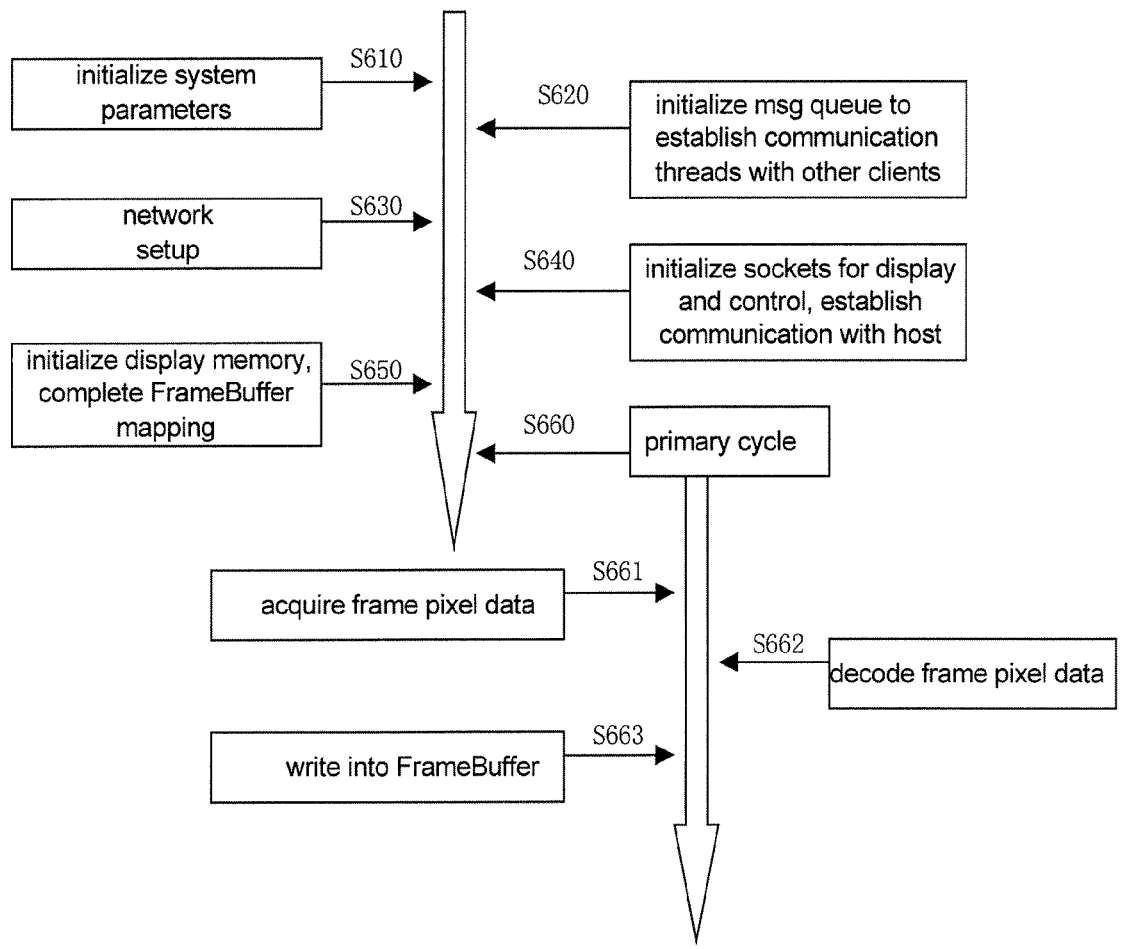
FIG. 6 is an operational flowchart for the display device-side data communication apparatus shown in FIG. 5.

Now, the operational flow of the device-side data communication apparatus will be specifically described with reference to FIG. 6 in the case of the example shown in FIG. 5.

At step S610, several system parameters are initialized, such as the supported display resolution, the accepted maximum number of clients, i.e., display devices.

At step S620, an msg queue is initialized to establish communication with any other client thread.

At step S630, network setup is carried out. To be more specific, the corresponding IP addresses and ports need to be set, and the maximum number of network connections is set based on the accepted maximum number of clients.

At step S640, Sockets for display and control are initialized to establish communication with the transmitting side. That is, Sockets for display and control are started according to the network setup in step S630 so as to put them into a listening status.

At step S650, a display memory is initialized and FrameBuffer mapping is executed so that corresponding adjustment can be performed on the display memory according to the system parameters before the client's data is received from the transmitting side.

At step S660, the flow enters a primary cycle which comprises:

at step S661, after the client has established connection with the transmitting side via Socket for control, the transmitting side acquires data packets, which contain frame pixel data and are sent by the client, through Socket for control;

at step S662, the transmitting side decodes the received data packets according to the corresponding protocol to obtain image data;

at step S663, the image data are written into FrameBuffer of the data communication apparatus; eventually, the transmitting side writes the image data into a proper location in FrameBuffer and completes the final display.

According to one embodiment of the present invention, the display device-side data communication apparatus 200 can be designed as inserted externally on the display device 900, for example, it is inserted externally on the VGA/DVI interface of the display device 900. Besides, the display device-side data communication apparatus 200 can be integrated into the display device 900, and the description thereof will omitted.

Figure 7:
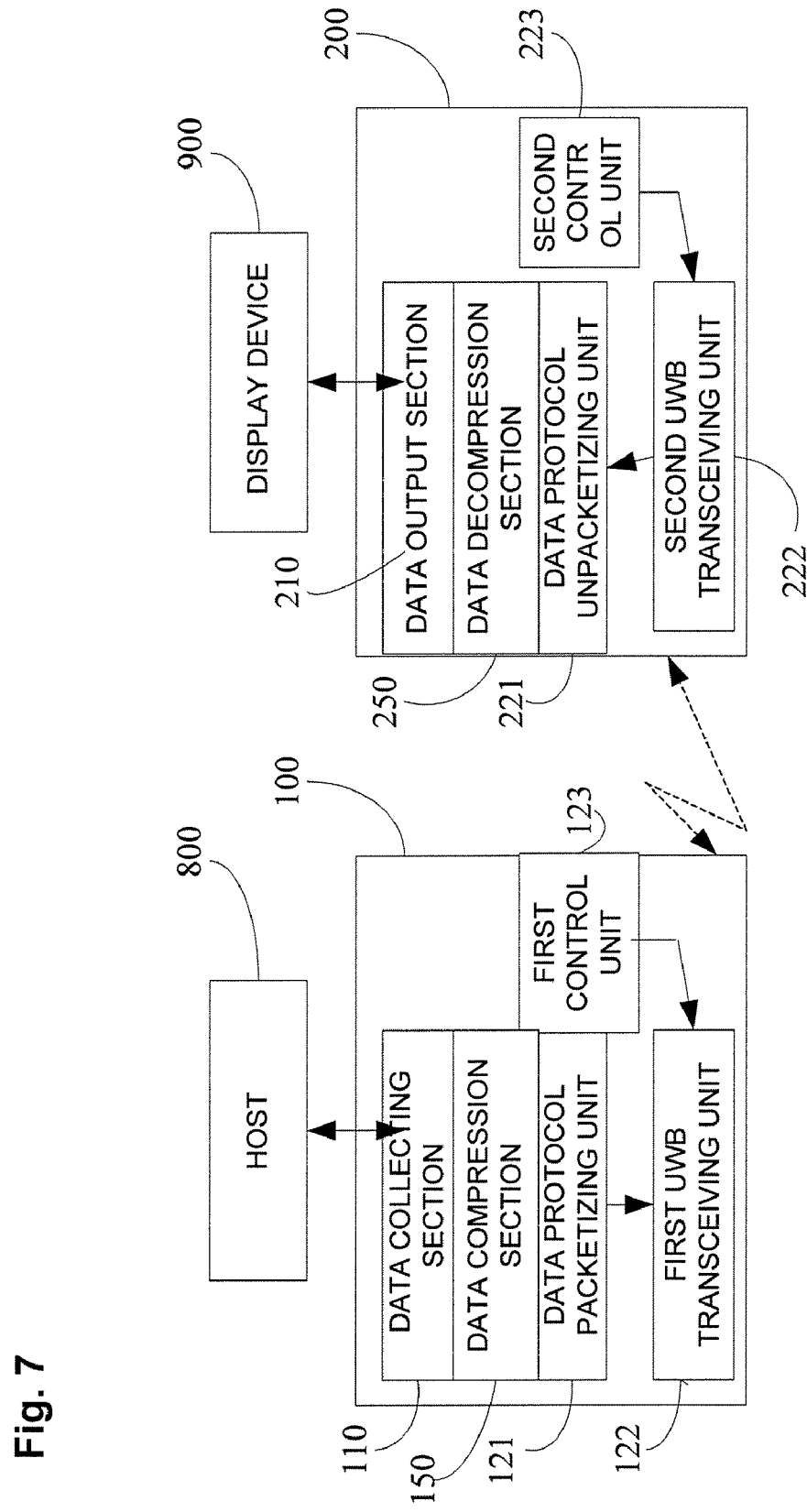
FIG. 7 is a block diagram for a variant of the wireless display system of the first embodiment of the present invention.

FIG. 7 is a block diagram for a variant of the wireless display system of the first embodiment of the present invention.

This variant is substantially the same as the first embodiment except that a data compression unit 150 is provided in the host-side data communication apparatus 100 and used to compress the display data sampled by the data collecting section 110 and then transfer the compressed data to the data protocol packetizing unit 121. Accordingly, a data decompression unit 250 is provided in the display device-side data communication apparatus 200 and used to decompress the screen data unpacketized by the data protocol unpacketizing unit 221 and then transfer the decompressed data to the data output section 210.

Figure 8:
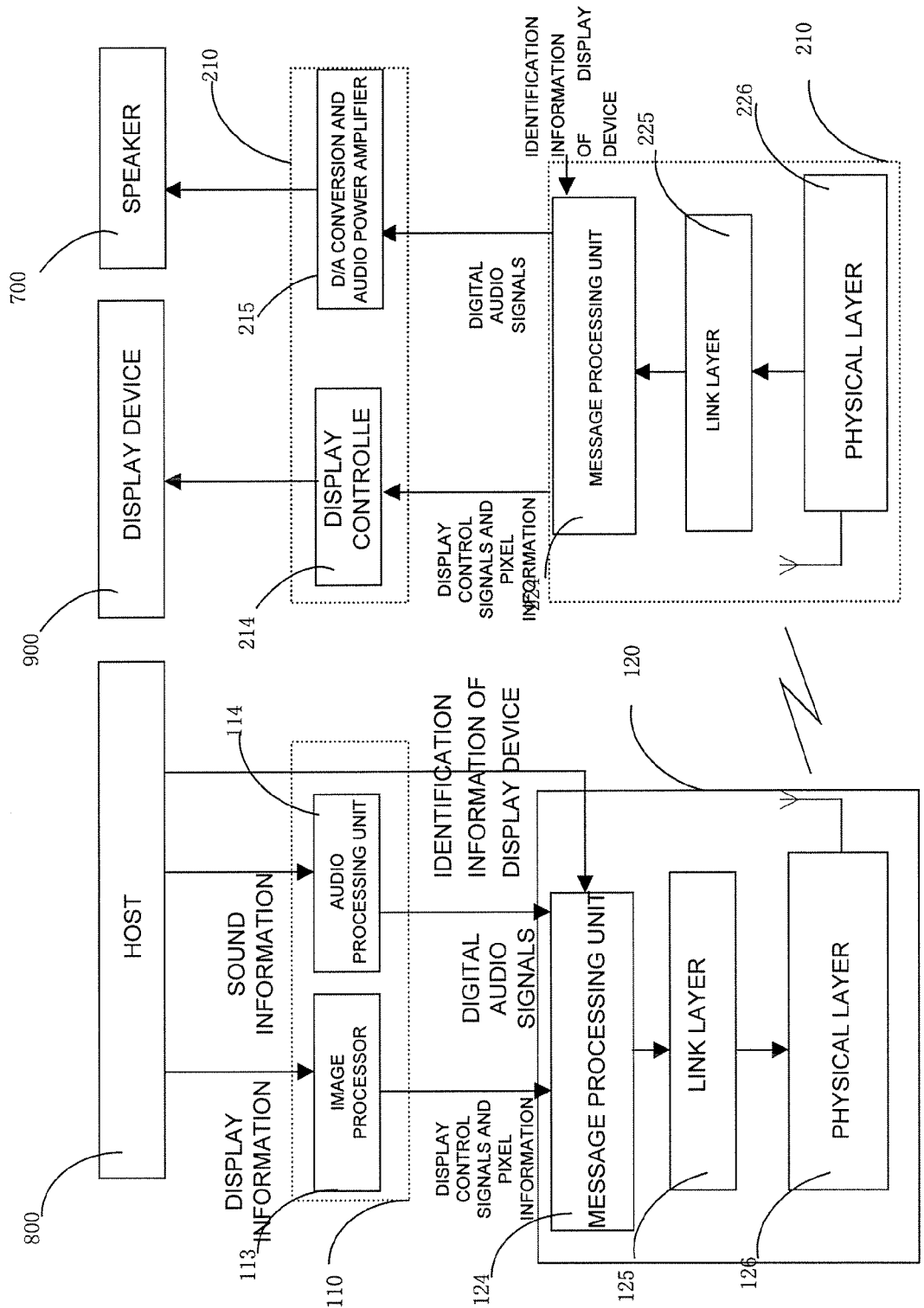
FIG. 8 is a block diagram for the wireless display system of the second embodiment of the present invention.

FIG. 8 illustrates the second embodiment of the present invention and shows the signal transmission process when the host requests the display device to display via a wireless network. In addition to transmitting the display data from the host 800 to the display device 900, the wireless display system according to the second embodiment enables a realtime transmitting of audio information to a speaker 700 located together with the display device.

As shown in FIG. 8, the display information and audio information of the host 800, such as computer or electronic device, are converted into wireless network message and transferred to the display device 900 and the speaker 700 over a wireless network. At the side of the display device, the received wireless network message is decoded eventually into pixel information and display control signals for driving the display to display corresponding information as well as into digital audio signals for driving the speaker to emit sound.

As shown in FIG. 8, the host 800 transfers the display information to be display to the image processor 113, which in turn generates corresponding pixel information and display control signals (e.g., field signals, line signals) from the image information. The pixel information and display control signals are sent to the message processing unit 124, processed by it and transmitted to the link layer 125. The link layer 125 performs further message coding on the processed pixel information and display control signals, which are transported to the physical layer 126 for further coding. The encoded pixel information and display control signals are modulated into wireless signals and finally transmitted over a wireless network. UWB (Ultra Wideband) wireless network is used as the wireless network in FIG. 8, and the signals are transmitted via RF (Radio frequency).

When the audio information needs to be sent to the speaker 700 at the side of the display device for audio play, the host 800 transfers the audio information to the audio processing unit 114, which generates digital audio signals and transfers these signals to the message processing unit 124. The digital audio signals undergo message coding in the same manner as that for the video signals and then go out via the physical layer 126. Identification information can be added in the process of message coding in order to distinguish the audio signals and video signals.

To enable the host 800 and its corresponding display device 900 to identify each other properly and thus avoid transmission error, the display device 900 has identification information, which can be a specific code or key information. The identification information of the display device is sent to the message processing unit 124, which encodes the probe message based on the identification information of the display device and sends it out as well as establishes the connection with the display device 900 based on the probe response message from the display device.

The processing flow at the side of the display device is contrary to that at the side of the host so as to display the display information on the screen of the display device 900 and to play the audio information through the speaker 700.

As shown in FIG. 8, a physical layer 226 (in this figure, taking UWB wireless network as an example) at the side of the display device receives wireless signals transmitted from the computer or the electronic device. The physical layer 226 receives the wireless signals, which are then transferred to a link layer 225 after undergoing signal modulation and decoding. The link layer 225 performs further message decoding on the received signals and transfers them to a message processing unit 224 for decoding. The message is decoded into pixel information and display control signals, which are then sent to a display controller 214. The display controller 214 drives the display device 900 according to the pixel information and display control signals so that the corresponding content can be displayed. When there is also audio information in the above transferred message, the message processing unit 224 will convert the audio information in the message into digital audio signals, which are then supplied to a audio power amplifier and D/A conversion unit 215 driving the speaker 700 to emit sound.

As mentioned previously, in order to achieve the identification between the display device 900 and the host 800, the message processing unit 224 holds the identification information of the display device and can compare the identification information of the display device with the identification information of display device contained in the received message. If the two pieces of information match, the message processing unit 224 determines that the received message is sent by the corresponding host and thus process the message.

Figure 9:
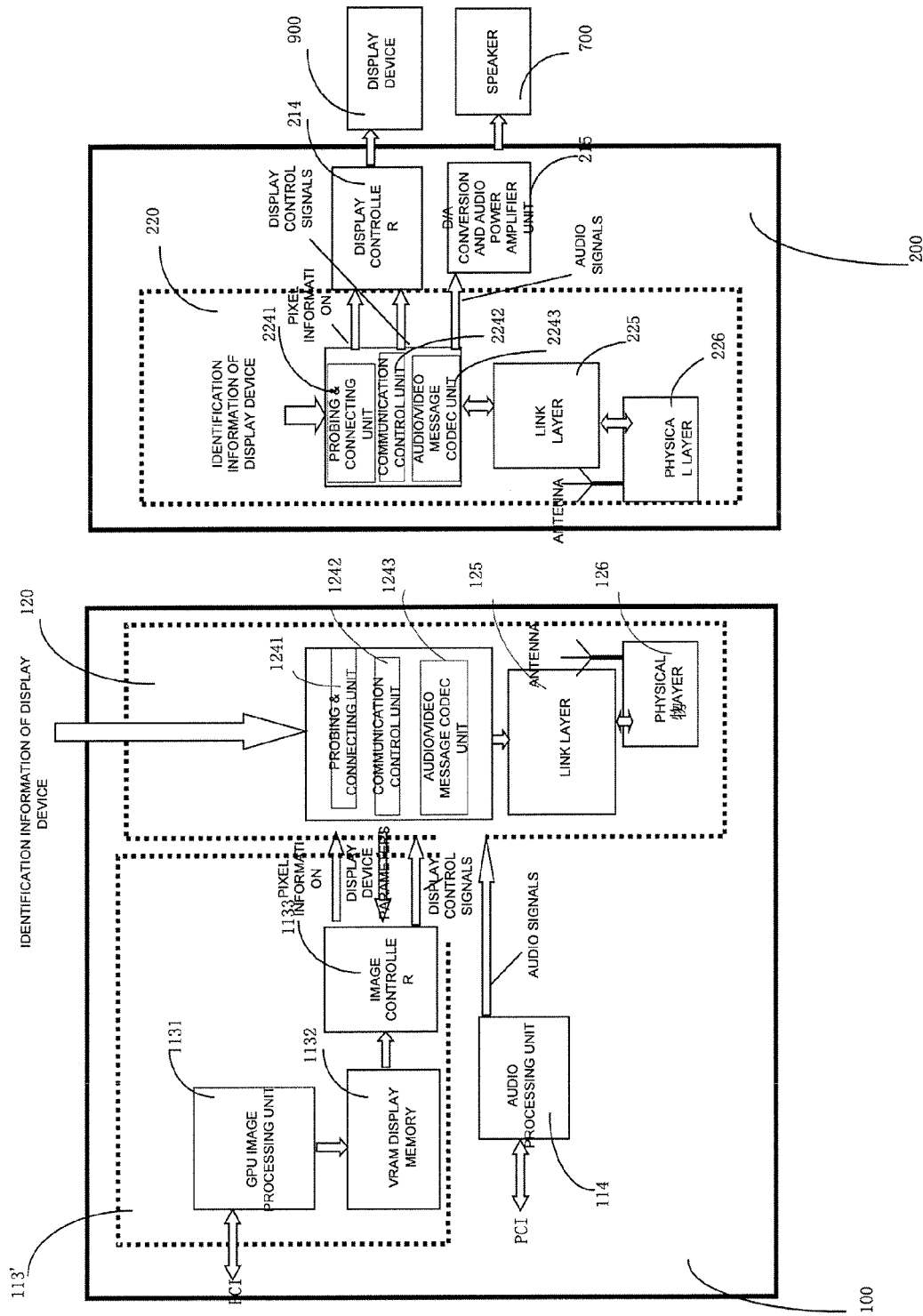
FIG. 9 is a detailed structural diagram for the wireless display system of the second embodiment of the present invention.

FIG. 9 is a detailed structural diagram for the wireless display system of the second embodiment of the present invention.

As shown in FIG. 9, the wireless display system comprises a host (not shown), a host-side data communication apparatus 100, a display device 900, a speaker 700 and a display device-side data communication apparatus 200.

The host-side data communication apparatus 100 receives display information data transferred from a PCI (Peripheral Component Interconnect) bus in the host and converts the data into wireless display signals for emission to the outside.

The display device-side data communication apparatus 200 receives the wireless display signals and, based on these signals, drives the display device 900 to display relevant content.

The host-side data communication apparatus 100 includes a display adapter 113', an audio processing unit 114, a host-side UWB communication section 120. The host-side data communication apparatus 100 is composed by integrating the audio processing unit 114 and the host-side UWB communication section 120 with the basic display adapter 113'.

The display adapter 113' includes an image Processing Unit (GPU) 1131, a display memory (VRAM) 1132 and an image controller 1133.

The image processing unit 1131 receives image information transferred from the PCI bus, analyzes and process it to form pixel information.

The display memory 1132 receives the pixel information supplied from the image processing unit 1131 and stores it in certain format.

The image controller 1133 reads the pixel information stored in the display memory 1132, adds control signals including field signals, line signals and the like, and output these signals.

The audio processing unit 114 receives audio signals sent by the PCI bus and converts them into audio signals for outputting.

The host-side UWB communication section 120 receives the pixel information and the control signals outputted from the display adapter 113' as well as the audio signals outputted from the audio processing unit 114, and converts them into wireless signal for outputting.

The host-side UWB communication section 120 consists of a probing & connecting unit 1241, a communication control unit 1242, an audio/video message codec unit 1243, a link layer 125 and a physical layer 126.

The display device-side data communication apparatus 200 includes a display device-side UWB communication section 220, a display controller 214 and a D/A conversion and audio power amplifier unit 215.

The display device-side UWB communication section 220 is composed of a probing & connecting unit 2241, a communication control unit 2242, an audio/video message codec unit 2243, a link layer 225 and a physical layer 226.

The probing & connecting unit 1241 establishes a wireless connection between the host 800 and the display device 900. Particularly, the probing & connecting unit 1241 first probes whether the display device 900 is present and then acquires the technical parameters of the display device 900 so as to eventually establish the wireless connection between the host 800 and the display device 900.

Figure 10:
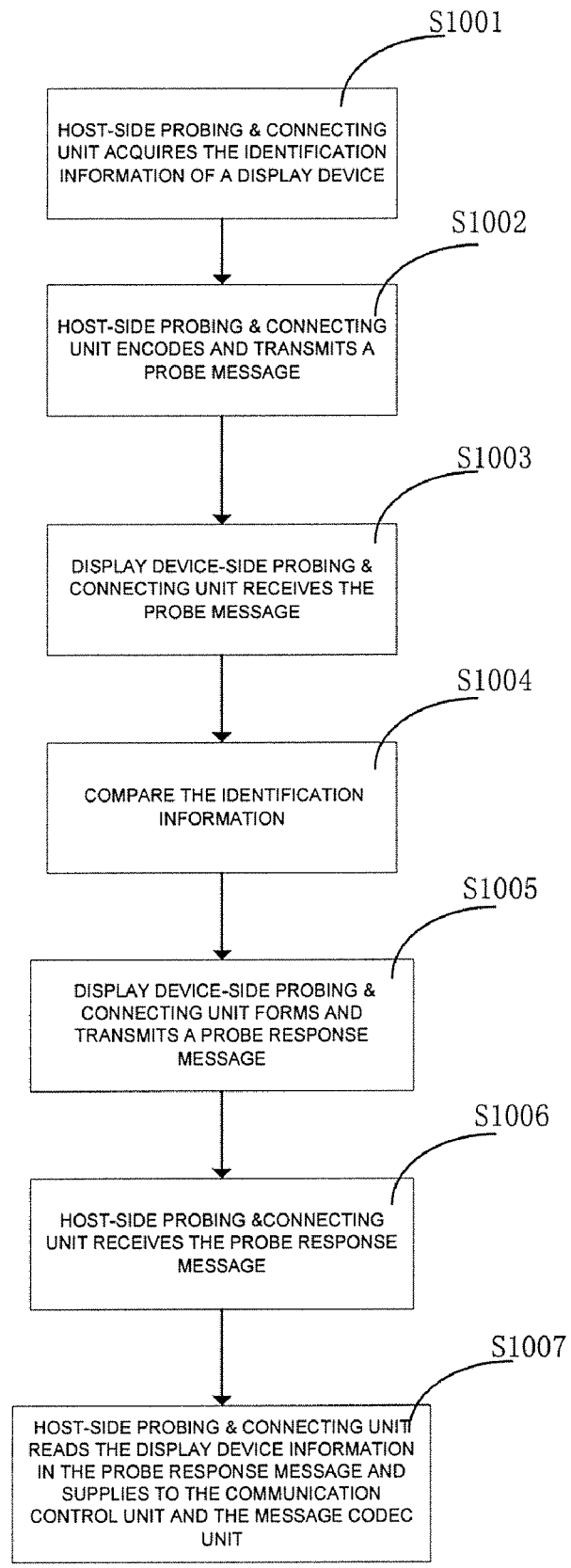
FIG. 10 is a flowchart for establishing a wireless connection between the host and the display device in the wireless display system of the second embodiment of the present invention.

FIG. 10 shows a flowchart for a probe and connect process carried out by the probing & connecting unit 1241.

At step S1001, the probing & connecting unit 1241 at the side of the host acquires the identification information of a display device, which information is a specific code or key information and used to identify a display device corresponding to the host. Such identification information of a display device is pre-configured into the probing & connecting unit 1241 so that the probing & connecting unit 1241 can obtain this information at the beginning of its operation.

At step S1002, the probing & connecting unit 1241 at the side of the host encodes a probe message containing the identification information of a display device and supplies the message to the link layer 125, which converts it into an appropriate form and then transfers it to the physical layer 126. Finally, the physical layer 126 transmits the message via a UWB wireless network.

At step S1003, the display device receives the probe message via the physical layer 226 and then sends the message to the link layer 225 at the side of the display device, which processes the message and sends it to the probing & connecting unit 2241 at the display device side.

At step S1004, the probing & connecting unit 2241 at the display device side reads the identification information contained in the received probe message and compares it with the identification information at the display device side. The flow proceeds to the next step when the two pieces of information coincide.

At step S1005, the probing & connecting unit 2241 at the display device side encodes and forms a probe response message containing the technical parameters and model of the display device, and sends the message to the link layer 225 at the display device side. The link layer 225 performs further message coding on the message and sends it to the physical lay 226, which transmits the message via the UWB wireless network.

At step S1006, the host-side probing &connecting unit 1241 receives the probe response message through the link layer 125 and the physical layer 126 at the host side.

At step S1007, the host-side probing &connecting unit 1241 reads the probe response message of the display device transmitted via UWB, acquires the display device parameters, such as some technical parameters and model, contained in the message, and supplies the display device parameters to the display adapter 113', the communication control unit 1242 and the message codec unit 1243 for proper information transmission.

The communication control unit 1242 carries out the following two tasks.

(1) It determines transmission parameters, such as bandwidth or transmission rate, based on the current resolution parameter of image quality set by the user as well as the model and supported pixel format obtained via the probing & connecting unit 1241, and then sends the determined transmission parameters to the link layer 125 so as to control the signal modulation executed by the physical layer 126. Meanwhile, the communication control unit 1242 sends the technical parameters, such as resolution and model of the display device, to the display adapter so that the latter can determine that how many pixels are contained in one line and how many lines are contained in one field.

(2) The communication control unit 1242 also probes the strength of the wirelessly-transmitted signals from the display device and packet loss ratio, calculates the distance or interference between the host and the display device based on the probe result and supplies power consumption parameters to the link layer 125 according to the calculated value so as to adjust the signal transmitting power of the physical layer 126. The probing of signal strength can be realized by examining packet loss ratio and message transmission integrity.

The audio/video message codec unit 1243 performs message coding on the audio data as well as the video pixel information and control signals so that these content can be transmitted. The encoded message contains at least the following information:

(1) identification information of a display device: the information enables the display device to confirm that it has received the wirelessly-transmitted information which is destined to itself;

(2) message type information: the information serves mainly to discriminate audio message from video message so that the display device can conduct appropriate processing, and the information is also used to distinguish other message types;

(3) message length information;

(4) detailed audio/video message data;

(5) message check code.

The video message data consists of at least the following content:

(1) field synchro information;

(2) line synchro information;

(3) pixel cell identification;

(4) pixel data.

The above types of information can be positioned in such an order that the line synchro information is followed by all pixel information contained in one line, and the filed synchro information is followed by the pixel information contained in all lines within one field. If audio data is also contained, the pixel information of one field can be followed immediately by the corresponding audio information.

The encoded audio/video message is transferred to the link layer 125 and further modulated and transmitted by the physical layer 126.

After that, the physical layer 126 receives the probe message and audio/video message sent by the host via the UWB wireless network, decodes the messages and then outputs them. At the same time, the physical layer 226 receives the probe response message or any other response message sent from the link layer at the display device side, encodes and modulates it and then transmits it in radio frequency (RF).

The link layer 225 at the display device side receives the probe message and audio/video message transferred from the physical layer 226 at the display device side, decodes and outputs them. At the same time, the link layer 225 at the display device side receives the probe response message and any other response message, further encodes them and then transfers to the physical layer 226 at the display device side.

The probing & connecting unit 2241 is designed to establish a connection with the host. Particularly, the probing & connecting unit 2241 receives the probe message transmitted by the link layer 225 at the display device side, compares the identification information contained in the probe message with that of the display device, and generates a probe response message when the two piece of information coincide. The probe response message is then transferred to the link layer 225 at the display device side and eventually transmitted via the UWB wireless network. The probe response message contains the technical parameters and model of the display device.

The communication control unit 2242 detects the integrity check code of the probe message and, based on this code, configures the parameters of the link layer 225 and the physical layer 226. During the wireless display, the parameters of link and physical layer are adjusted based on audio/video quality parameters and the signal strength between the transmitting and receiving side. The communication control unit can also check whether the message is correct on the basis of message content, generates a correct flag if the check result is YES and transmits the correct flag via the wireless network. If the check fails, a retransmission flag is generated and transmitted via the wireless network.

The audio/video message codec unit 2243 receives the audio/video message from the link layer 225, reads the message type information contained in the message and determines the type of the message based on the type information. If the message is determined to be video message, the message is decoded to generate pixel information and control signals, such as field synchro and line sychro information, which information is transferred to the display controller 214. If the message is audio message, the audio message will be decoded to generate audio data to be sent to the D/V conversion and audio power amplifier unit 215.

The display controller 214 receives the control signals and pixel information passed from the display device-side UWB communication section 220, converts them into appropriate display driving signals to drive the display device 900.

The display device 900 receives the display driving signals issued by the display controller 214 and perform the function of displaying according to the signals.

The D/V conversion and audio power amplifier unit 215 is designed to receive the audio signals outputted from the display device-side UWB communication section 220 and converts the signals from digital to analog for driving the audio power amplifier, which in turn drives the speaker 700 to emit sound.

The above wireless communication is carried out in accordance with the corresponding data transport protocol. Such data transport protocol is customized according to the purpose of wireless display and the component condition of wireless communication devices.

Figure 11:
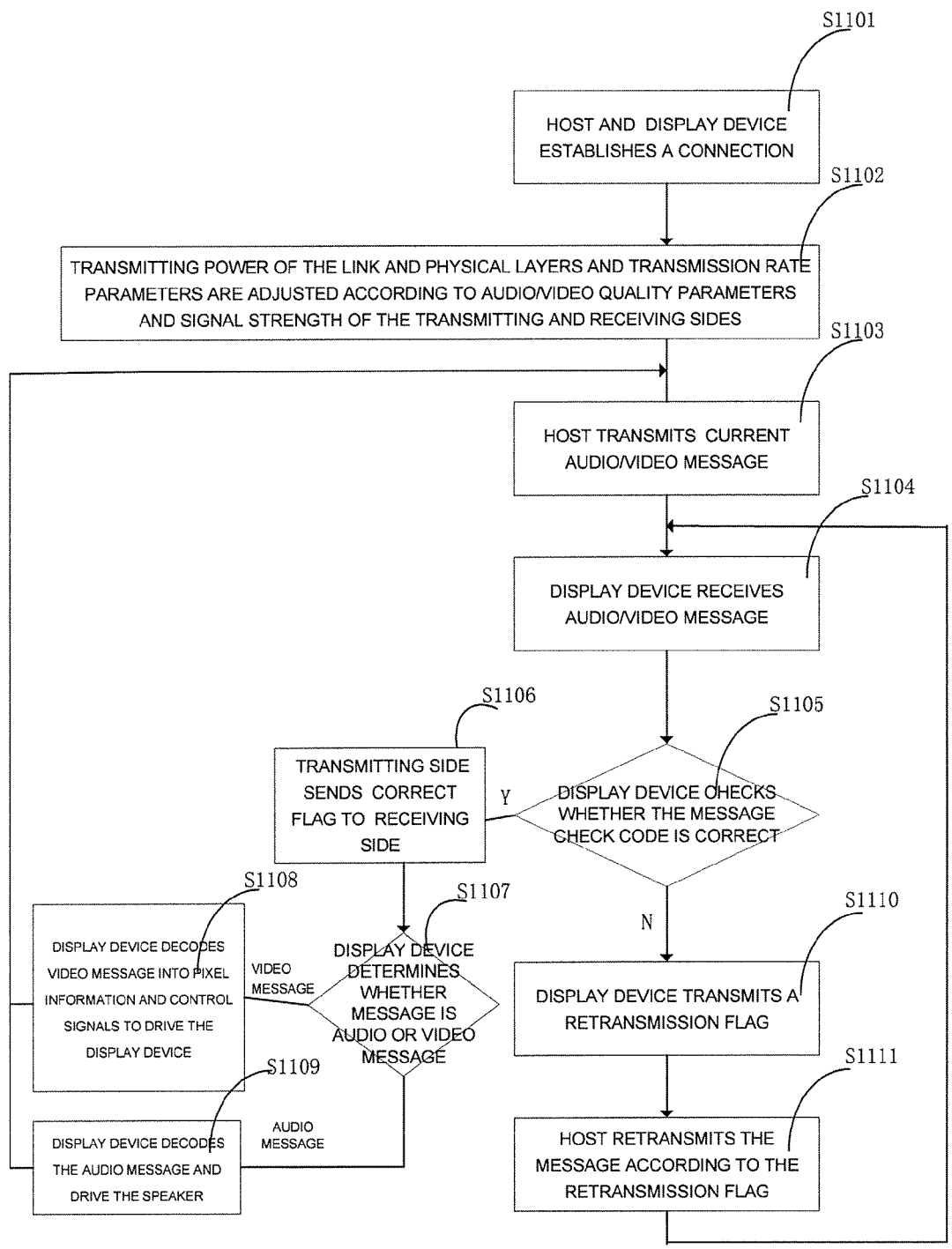
FIG. 11 is a flowchart for the data transmission protocol used in the wireless display system of the second embodiment of the present invention.

The data transport protocol contains at least such processing steps as discovery and probe of a device, adjustment of transmission channel parameters for wireless communication, transmitting and receiving of audio/video message as well as processing of channel service quality, the specific flow is illustrated in FIG. 11.

At step S1101, the host (the transmitting side) and the display device (the receiving side) establishes a connection. First, the host sends a probe message containing the characteristic information of a display device. Having received the probe message, the display device compares the contained characteristic information with its own characteristic information, and sends back a probe response message to the host if the two pieces of information match. Then, the host receives the probe response message and learns the presence of the display device. The flow enters the next step.

At step S1102, the host determines transmission parameters based on the display device parameters, such as technical parameters and model, contained in the probe response message. Between the transmitting and receiving sides, the transmitting power of the link and physical layers is adjusted according to audio/video quality parameters and signal strength. Also, the display device configures the parameters of the wireless network based on the integrity check code of the probe message.

At first, the host-side probing & connecting unit 1241 transfers the information contained in the obtained probe response message, such as technical parameters and model of the display device, to the host-side communication control unit 1242, which determines the transmission parameters based on the received information of technical parameters and model of the display device as well as the user-set display parameters and sends the transmission parameters to the host-side link layer 125. The host-side link layer 125 controls signal modulation of the physical layer 126 according to the transmission parameters. Moreover, the host-side probing & connecting unit 1241 also transfers the information contained in the obtained probe response message, such as technical parameters and model of the display device, to the host-side message codec unit 1243, which determines the format for message coding based on the information. Besides, the host-side probing & connecting unit 1241 also transfers these parameters of the display device to the display adapter 113', which determines pixel information format, the number of pixels contained within one line and the number of lines contained within one filed according the parameters of the display device.

In the procedure of probing and discovering the display device, the quality of the transmitted signals can be learned, and based on that, parameters such as transmitting power and transmission rate can be adjusted. The above steps are fulfilled by the communication control units of the transmitting and receiving sides and include: the host-side communication unit 1242 calculates the distance and interference between the host and the display device from the strength of the signals transmitted by the display device and packet loss ratio during the procedure of probing and discovering, and, based on the calculation result, adjusts the transmitting power of the physical layer; on the other hand, the display device-side communication control unit 2242 detects the integrity check code of the probe message and, based on that, configures the parameters of the link and physical layers at the display device side.

At step S1103, the host transmits the current audio/video message over the wireless network. The formation procedure of such audio/video message is as described previously.

At step S1104, the display device receives audio/video message, the receiving procedure of which is as explained above.

At step S1105, the display device checks whether the message check code is correct, and the flow goes to step S1106 if the result is YES, otherwise the flow turns to step S1107. This step is completed by the communication control unit 2212 at the receiving (display device) side.

At step S1106, the display device sends a correct flag to the host.

At step S1107, the display device decodes the received message and, from the contained type information, determines whether the message is audio or video message. The flow will proceed to step S1108 if it is video message, while the flow turns to step S1109 if it is audio message.

At step S1108, the display device decodes the received video message into pixel information and control signals and transfers them to the display controller 214, which generates driving signals to drive the display device 900 for displaying. Then, the flow returns to step S1103.

At step S1109, the display device decodes the received audio message into audio data and sends them to the D/A conversion and audio power amplifier unit 215, which generates driving signals to drive the speaker to emit sound. Then, the flow goes back to step S1103.

At step S1110, the display device transmits a retransmission flag.

At step S1111, the host retransmits the audio/video message according to the retransmission flag, and the flow turns to step S1104.

Figure 12:
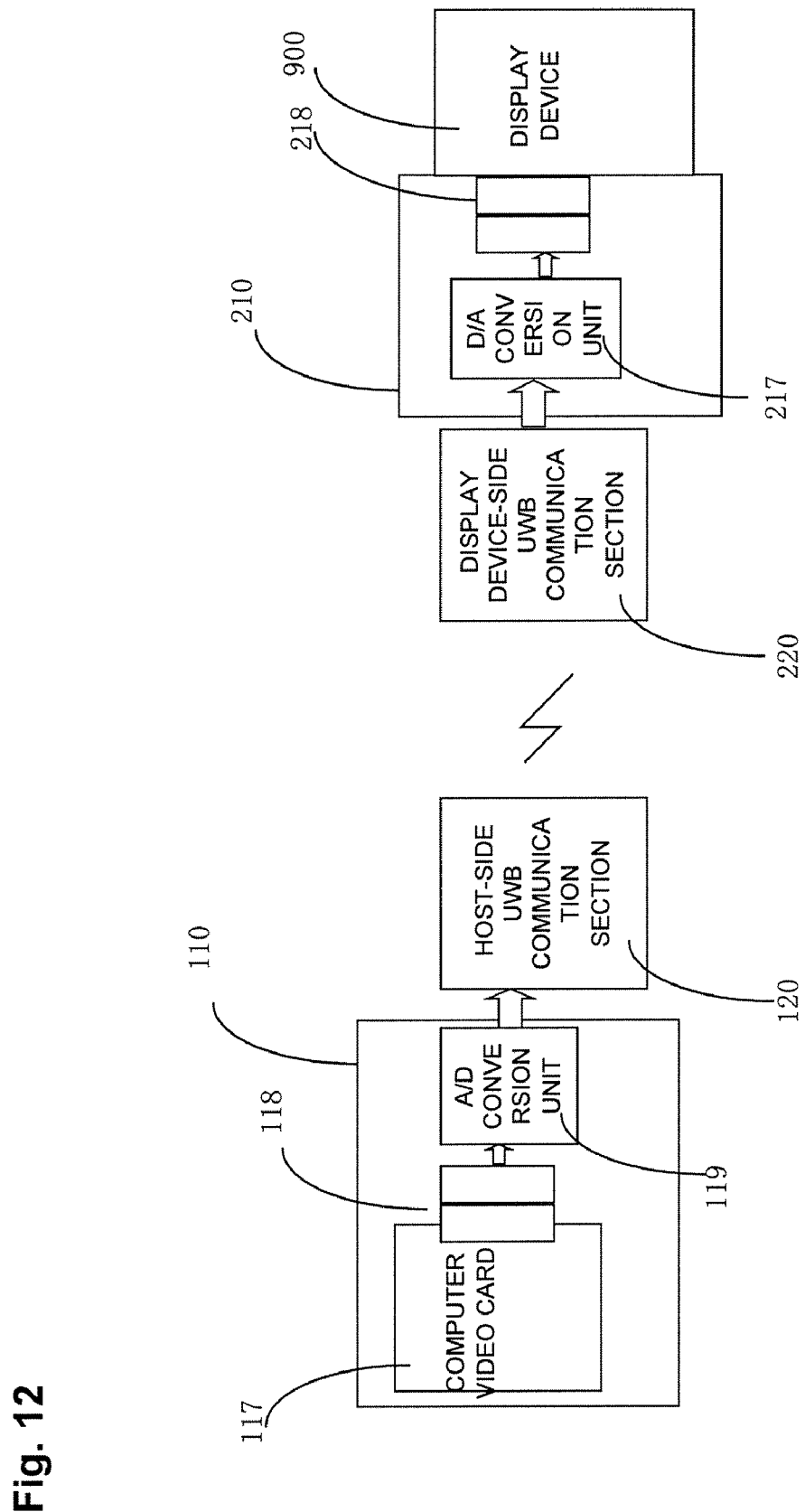
FIG. 12 is a block diagram for the wireless display system of the third embodiment of the present invention.

FIG. 12 is a block diagram for the wireless display system of the third embodiment of the present invention.

As shown in FIG. 12, a computer graphics adaptor 117 at the host side is connected to the host-side UWB communication section 120 via a wired audio/video interface 118 (in particular, VGA/DVI interface). The host-side UWB communication section 120 is a hardware module independent of the computer graphics adaptor and can be easily connected to the computer graphics adaptor through the wired audio/video interface 118. The host-side UWB communication section 120 receives video display signals transferred from the computer graphics adaptor and converts the signals into UWB message to be transmitted via a UWB network. Since the signals outputted by the computer graphics adaptor through the VGA/DVI interface 118 are analog signals, these signals need to be converted into digital signals by a A/D conversion unit 119 before wireless transmission of the signals, and then can be processed and transmitted by the host-side UWB communication section 120, which has the same internal structure and functions as that of the host-side UWB communication section in the wireless display system of the first embodiment.

At the display device side, the UWB communication section 220 is connected to the display device 900 via a wired audio/video interface VGA/DVI 218. The display device-side UWB communication section 220 receives the message transmitted over the UWB network, decodes it into pixel information and control signals, and sends them through the wired audio/video interface VGA/DVI 218 to the display device 900 for displaying. Also, the display device-side UWB communication section 220 is a separate hardware module and can be easily connected to the display device via the wired audio/video interface. Since the signals outputted through the interface VGA-DVI 218 should be analog signals, a D/A conversion unit 217 is integrated into the data output section 210 so that the unit 217 can receives the digital video signals outputted from the device-side UWB communication section 220, converts them into analog signals and outputs these signals through wired audio/video interface VGA/DVI 218 to the display device 900 for displaying. The device-side UWB communication section 220 has the same structure and functions as that of the device-side UWB communication section 220 according to the first embodiment.

As such, wireless communication of data is realized by using the separate wireless data communication units connected respectively to the host and the display device, without any modification to the existing computer graphics adaptor and the display device.

Those skilled in the art will understand that the wireless display system of the present invention can also be embodied in several different modes:

one-to-one display, for example, one PC host vs. one display, in which case each of data communication apparatus is connected to the host and the display;

one-to-many display, for example, one PC host vs. a plurality of displays, in which case UWB transport protocol from the host to each of the displays is implemented by multicast or broadcast, and it can also be realized by a plurality of unicast;

many-to-one display, for example, a plurality of notebook computers vs. one projector, in which case each computer is projected to a part of the screen of the display device, and the screen data delivered from each computer can be sampled data other than full-screen data;

many-to-many display, for example, a plurality of notebook computers are simultaneously projected to a plurality of projectors, which case is combination of the above second and third cases.

Figure 13:
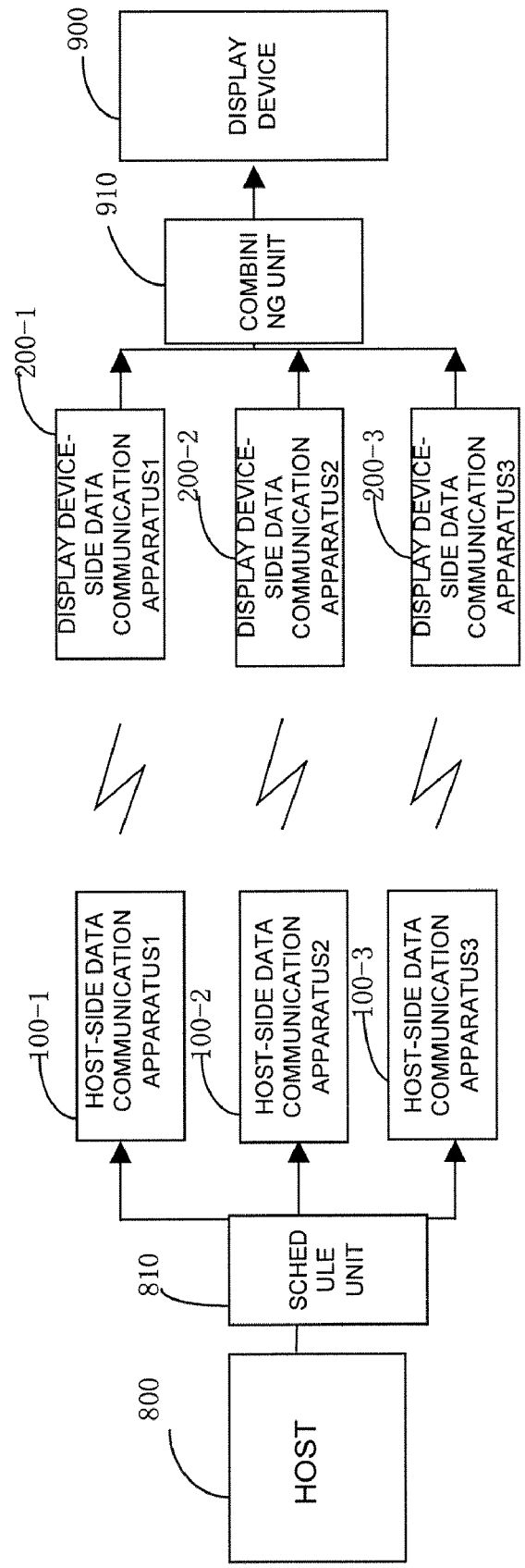
FIG. 13 is a block diagram for the fourth embodiment of the present invention.

FIG. 13 is a block diagram for the fourth embodiment of the present invention.

As shown in this figure, a host 800 is connected to a plurality of host-side data communication apparatus 100-1, 100-2 and 100-3 (in the figure, three data communication apparatus are used) via a schedule unit 810. Correspondingly, display device-side data communication apparatus 200-1, 200-2 and 200-3 (in the figure, three data communication apparatus are used) of the same number are provided at the display device side and connected to the display device via a combining unit 910.

The above respective data communication sections occupy different channel or frequency bandwidth on the physical layer so that the multiple units can operate at the same time, thereby broadening the overall bandwidth and rate of wireless transmission. The schedule unit 810 at the host side is designed to divide audio/video data into blocks and allocate the blocks of audio/video data to the respective host-side data communication apparatus 100-1, 100-2 and 100-3, which transmit these data blocks in parallel. At the display device side, the device-side data communication apparatus 200-1, 200-2 and 200-3 receive the information sent from the corresponding host-side data communication apparatus, respectively, and the combining unit 910 combines the information received by the device-side data communication apparatus and reverts it to the complete content for audio/video display.

The technical solutions provided in the present invention can endow the wireless data communication units with sufficient bandwidth so as to meet the requirement imposed by a large amount of image information.

The foregoing description is only made to the preferred embodiments of the present invention. It should be noted to those ordinarily skilled in the art that various modifications and refinements can be made within the principle of the present invention and should be encompassed by the scope of the present invention.

What is claimed is:

1. A wireless display system, comprising a host-side data communication apparatus and a display-device side data communication apparatus, wherein the host-side data communication apparatus comprises:
   a sampling section which samples display data from the hardware of host;
   a data protocol packetizing section which packetizes the display data sampled by the sampling section into corresponding data message in accordance with certain network transport protocol;
   a transmitting section which transmits the data message wirelessly;
   the display-device side data communication apparatus comprises:
   a receiving section which receives the data message transmitted wirelessly;
   a data protocol unpacketizing section which unpacketizes the data message to obtain the display data; and
   an output section which performs high-speed refresh processing by using the display data,
   wherein the data message contains at least (1) field synchro information, (2) line synchro information, (3) pixel cell identification, and (4) pixel data.

2. The wireless display system according to claim 1, wherein the host-side data communication apparatus further comprises a data compression section which compresses the sampled display data, and the display-device side data communication apparatus further comprises a data decompression section which decompresses the display data unpacketized by the data protocol unpaketizing section and then transferring to the output section.

3. The wireless display system according to claim 1, wherein the network transport protocol is one of TCP/IP, wireless USB protocol, wireless 1394 protocol, DVI/HSDI protocol or other predetermined transmission protocol.

4. The wireless display system according to claim 1, wherein the sampling section is inserted externally at the output interface of the graphics adaptor of host or connected directly to the output interface of a graphics adaptor internally.

5. A wireless display system, comprising a host-side data communication apparatus and a plurality of display-device side data communication apparatuses, wherein the host-side data communication apparatus comprises:
   a sampling section which samples display data from the hardware of host;
   a data protocol packetizing section which packetizes the display data sampled by the sampling section into corresponding data message in accordance with certain network transport protocol;
   a transmitting section which transmits the data message wirelessly;
   each of the display-device side data communication apparatuses comprises:
   a receiving section which receives the data message transmitted wirelessly;
   a data protocol unpacketizing section which unpacketizes the data message to obtain the display data; and
   an output section which performs high-speed refresh processing by using the display data,
   wherein the data message contains at least (1) field synchro information, (2) line synchro information, (3) pixel cell identification, and (4) pixel data.

6. A wireless display system, comprising a plurality of host-side data communication apparatuses and a display-device side data communication apparatus, wherein each of the host-side data communication apparatuses comprises:
   a sampling section which samples display data from the hardware of host;
   a data protocol packetizing section which packetizes the display data sampled by the sampling section into corresponding data message in accordance with certain network transport protocol;
   a transmitting section which transmits the data message wirelessly;
   the display-device side data communication apparatus comprises:
   a receiving section which receives the data message transmitted wirelessly;
   a data protocol unpacketizing section which unpacketizes the data message to obtain the display data; and
   an output section which combines the display data corresponding to the hosts into a frame and performs high-speed refresh processing by using the display data.

7. A wireless display system, comprising a plurality of host-side data communication apparatuses and a plurality of display-device side data communication apparatuses, wherein each of the host-side data communication apparatuses comprises:
   a sampling section which samples display data from the hardware of host;
   a data protocol packetizing section which packetizes the display data sampled by the sampling section into corresponding data message in accordance with certain network transport protocol;
   a transmitting section which transmits the data message wirelessly;
   each of the display-device side data communication apparatuses comprises:
   a receiving section which receives the data message transmitted wirelessly;
   a data protocol unpacketizing section which unpacketizes the data message to obtain the display data; and
   an output section which combines the display data corresponding to the hosts into a frame and performs high-speed refresh processing by using the display data.

8. A wireless display system, comprising a host-side data communication apparatus and a display-device side data communication apparatus, wherein the host-side data communication apparatus comprises:
   a data collecting section which collects the media data comprising display data and audio data from the hardware of host directly;
   a data protocol packetizing section which packetizes the media data collected by the collecting section into corresponding data message in accordance with certain network transport protocol;
   a transmitting section which transmits the data message wirelessly;
   the display-device side data communication apparatus comprises:
   a receiving section which receives the data message transmitted wirelessly;
   a data protocol unpacketizing section which unpacketizes the data message to obtain the media data comprising display data and audio data; and
   an output section which outputs the display data and the audio data to the display device and the speaker respectively,
   wherein the transmitting section comprises:
   a probing & connecting unit for establishing a wireless connection between the host and the display device;
   a communication control unit for control communication quality;
   a radio unit which receives the message and further encoding and modulating it to wireless signals for transmission,
   the data message contains at least (1) field synchro information, (2) line synchro information, (3) pixel cell identification, and (4) pixel data.

9. The wireless display system according to claim 8, wherein the data collecting section comprises:
   an image processing unit for receiving display information and converting it into pixel information and display control signals; and
   an audio processing unit for receiving sound information and converting it into audio signals.

10. The wireless display system according to claim 8, wherein the communication control unit receives display device parameters transferred by probe response message, determines transmission parameters and message coding format based on the display device parameters and user-set display parameters, and the radio unit transmits the transmission parameters and message coding format.

11. The wireless display system according to claim 8, wherein the communication control unit probes the strength of the signals transferred by the display device and packet loss ratio result, calculates the distance and interference between the host and the display device, and, based on these factors, adjusts the transmitting power of radio unit.

12. The wireless display system according to claim 8, wherein the message contains at least (1) display device identification information, (2) message type information, (3) message length information and (4) video or audio message data.

13. The wireless display system according to claim 8, wherein all the types of information in the video message is positioned in such order that the filed synchro information is followed by the pixel information contained in all lines within one field, and the line synchro information is followed by all pixel information contained in one line.

14. The wireless display system according to claim 8, wherein the receiving section comprises:
    a radio unit which receives the data message from the host wirelessly;
    a control unit which controls the radio unit as well as performs authentication and negotiation on keys; and
    a data protocol unpaketizing unit which interprets the data message received by the radio unit into the display data and the audio data in accordance with corresponding protocol.

15. The wireless display system according to claim 8, wherein the data protocol unpaketizing unit is a HSDI control unit.

16. The wireless display system according to claim 8, wherein the output section comprises a VGA DMA unit, a VGA control unit and a VGA Timing unit.

17. The wireless display system according to claim 8, wherein the data protocol unpaketizing unit is an embedded processing chip.

18. The wireless display system according to claim 8, wherein the output section is a GPU.

19. The wireless display system according to claim 8, wherein the display device-side data communication apparatus is inserted externally on the display device or integrated into the display device.

20. The wireless display system according to claim 8, wherein the receiving section comprises:
    a radio unit which receives and decodes the wireless signals transmitted from the host;
    a codec unit which receives the decoded signals and further decodes them as pixel information, control signals or audio signals;
    a communication control unit which controls communication quality; and a probing & connecting unit which establishes a wireless connection between the host and the display device.

21. The wireless display system according to claim 20, wherein the communication control unit acquires from the control signals display device parameters used in determining line and field parameters.

22. The wireless display system according to claim 8, wherein the output section comprises:
    a display controller which receives pixel information and display control signals, drives the display device based on the information; and
    an audio output unit which receives the decoded audio signals and generates a drive signal for driving the speaker.

23. A wireless display system, comprising a host-side data communication apparatus and a plurality of display-device side data communication apparatuses, wherein the host-side data communication apparatus comprises:
    a data collecting section which collects the media data comprising display data and audio data from the hardware of host directly;
    a data protocol packetizing section which packetizes the media data collected by the collecting section into corresponding data message in accordance with certain network transport protocol;
    a transmitting section which transmits the data message wirelessly;
    each of the display-device side data communication apparatuses comprises:
    a receiving section which receives the data message transmitted wirelessly;
    a data protocol unpacketizing section which unpacketizes the data message to obtain the media data comprising display data and audio data; and
    an output section which outputs the display data and the audio data to the display device and the speaker respectively,
    wherein the data message contains at least (1) field synchro information, (2) line synchro information, (3) pixel cell identification, and (4) pixel data.

24. A wireless display system, comprising a plurality of host-side data communication apparatuses and a display-device side data communication apparatus, wherein each of the host-side data communication apparatuses comprises:
    a data collecting section which collects the media data comprising display data and audio data from the hardware of host directly;
    a data protocol packetizing section which packetizes the media data collected by the collecting section into corresponding data message in accordance with certain network transport protocol;
    a transmitting section which transmits the data message wirelessly;
    the display-device side data communication apparatus comprises:
    a receiving section which receives the data message transmitted wirelessly;
    a data protocol unpacketizing section which unpacketizes the data message to obtain the media data comprising display data and audio data; and
    an output section which combines the display data corresponding to the hosts into a frame and outputs the display data and the audio data to the display device and the speaker respectively.

25. A wireless display system comprising a plurality of host-side data communication apparatuses and a plurality of display-device side data communication apparatuses, wherein each of the host-side data communication apparatuses comprises:
    a data collecting section which collects the media data comprising display data and audio data from the hardware of host directly;
    a data protocol packetizing section which packetizes the media data collected by the collecting section into corresponding data message in accordance with certain network transport protocol;
    a transmitting section which transmits the data message wirelessly;
    each of the display-device side data communication apparatuses comprises:
    a receiving section which receives the data message transmitted wirelessly;
    a data protocol unpacketizing section which unpacketizes the data message to obtain the media data comprising display data and audio data; and an output section which combines the display data corresponding to the hosts into a frame and outputs the display data and the audio data to the display device and the speaker respectively.

26. A wireless display method comprising the steps of:
at host side,
   sampling display data from the hardware of host;
   packetizing the display data sampled into corresponding data message in accordance with certain network transport protocol;
   transmitting the data message wirelessly;
at display-device side,
   receiving the data message transmitted wirelessly;
   unpacketizing the data message to obtain the display data; and performing high-speed refresh processing by using the display data,
   wherein the data message contains at least (1) field synchro information, (2) line synchro information, (3) pixel cell identification, and (4) pixel data.

27. The wireless display method according to claim 26, further comprising the steps of: at host side, compressing the sampled display data, and at the display device side, decompressing the display data unpacketized and then transferring to the output section.

28. The wireless display method according to claim 26, wherein the network transport protocol is one of TCP/IP, wireless USB protocol, wireless 1394 protocol, DVI/HSDI protocol or other predetermined transmission protocol.

29. A wireless display method comprising the steps of:
at host side,
   collecting the media data comprising display data and audio data from the hardware of host directly;
   packetizing the media data collected into corresponding data message in accordance with certain network transport protocol;
   transmitting the data message wirelessly;
at display-device side,
   receiving the data message transmitted wirelessly;
   unpacketizing the data message to obtain the media data comprising display data and audio data; and
   outputting the display data and the audio data to the display device and the speaker respectively,
   wherein the data message contains at least (1) field synchro information, (2) line synchro information, (3) pixel cell identification, and (4) pixel data.

30. The wireless display method according to claim 29, further comprising a step of:
   establishing connection between the host and the display device before the step of transmitting.

31. The wireless display method according to claim 30, wherein the step of establishing connection comprises:
   transmitting probe message containing display device identification information from the host to the display device;
   receiving, by the display device, the probe message and comparing the identification information in the probe message with the identification information of the display device;
   transmitting probe response message from the display device to the host when the identification information in the probe message coincides with the identification information of the display device, the probe response message containing technical parameters and model of the display device; and
   receiving, by the host, the probe response message and establishing connection.

32. The wireless display method according to claim 31, further comprising the step of:
   determining, by the host, the coding format of the data message transmitted to the display device based on the technical parameters and model of the display device.

33. The wireless display method according to claim 32, further comprising the step of:
   calculating, by the host, the distance and interference between the host and the display device based on the strength of the signals transferred by the display device and packet loss ratio result during the connection establishment, and adjusting the transmitting power of wireless signals.

34. The wireless display method according to claim 33, further comprising the step of:
   detecting, by the display device, the integrity check code of the probe message so as to configure link layer parameters and physical layer parameters.

* * * * *

UNITED STATES PATENT AND TRADEMARK OFFICE
CERTIFICATE OF CORRECTION

| | | |
|---|---|---|
| PATENT NO. | : 8,213,858 B2 | Page 1 of 1 |
| APPLICATION NO. | : 12/096002 | |
| DATED | : July 3, 2012 | |
| INVENTOR(S) | : Wei Wei et al. | |

It is certified that error appears in the above-identified patent and that said Letters Patent is hereby corrected as shown below:

In the Title page

Under section (30) FOREIGN APPLICATION PRIORITY DATA please insert -- Dec. 5, 2005 (CN) 2005 10130009.5 -- and -- Dec. 14, 2005 (CN) 2005 10130572.2 --, therefor.

Signed and Sealed this
Thirtieth Day of October, 2012

David J. Kappos
*Director of the United States Patent and Trademark Office*